(12) United States Patent
Imakita et al.

(10) Patent No.: US 11,226,602 B2
(45) Date of Patent: Jan. 18, 2022

(54) CONTROL SWITCHING DEVICE, PLANT, CONTROL SWITCHING METHOD AND PROGRAM

(71) Applicant: Mitsubishi Hitachi Power Systems, Ltd., Yokohama (JP)

(72) Inventors: Koji Imakita, Yokohama (JP); Hiroyasu Ishigaki, Yokohama (JP); Ikuyo Abe, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 0 days.

(21) Appl. No.: 16/625,110

(22) PCT Filed: Jun. 21, 2018

(86) PCT No.: PCT/JP2018/023618
§ 371 (c)(1),
(2) Date: Dec. 20, 2019

(87) PCT Pub. No.: WO2019/004053
PCT Pub. Date: Jan. 3, 2019

(65) Prior Publication Data
US 2020/0150610 A1     May 14, 2020

(51) Int. Cl.
*G05B 17/02* (2006.01)
*G05B 9/03* (2006.01)
*G05B 7/02* (2006.01)

(52) U.S. Cl.
CPC .................... *G05B 17/02* (2013.01)

(58) Field of Classification Search
CPC ............. G05B 17/02; G05B 7/02; G05B 9/03
See application file for complete search history.

(56) References Cited

U.S. PATENT DOCUMENTS

2003/0033056 A1   2/2003   Kusaka et al.
2004/0156311 A1   8/2004   Hirano et al.
(Continued)

FOREIGN PATENT DOCUMENTS

JP   A-03-171201   7/1991
JP   2002-156147   5/2002
(Continued)

OTHER PUBLICATIONS

International Search Report dated Sep. 25, 2018 in International (PCT) Application No. PCT/JP2018/023618 with English translation.
(Continued)

*Primary Examiner* — Chad G Erdman
(74) *Attorney, Agent, or Firm* — Wenderoth, Lind & Ponack, L.L.P.

(57) ABSTRACT

A control switching device including an operation input part configured to receive a switching operation as to whether to use a second control execution part configured to carry out different control over a control object than a first control execution part for controlling the control object, and a control switching part to transition to a second control mode causing the second control execution part to control the control object according to an operation indicating use of the second control execution part to stop control of the first control execution part while having the second control execution part control the control object or to have the first control execution part and the second control execution part control the control object, or to transition to a first control mode causing the first control execution part to control the control object according to an operation indicating disuse of the second control execution part.

9 Claims, 12 Drawing Sheets

(56) References Cited

U.S. PATENT DOCUMENTS

| | | | | |
|---|---|---|---|---|
| 2004/0158474 A1* | 8/2004 | Karschnia | ............. | G06Q 10/06 |
| | | | | 379/29.01 |
| 2004/0267395 A1* | 12/2004 | Discenzo | ............. | G05B 13/024 |
| | | | | 700/99 |
| 2007/0168060 A1* | 7/2007 | Nixon | ................ | G05B 19/0426 |
| | | | | 700/83 |
| 2010/0063608 A1* | 3/2010 | Miller | ................. | G05B 19/409 |
| | | | | 700/97 |
| 2017/0006693 A1* | 1/2017 | Raposo | ................. | H05B 47/19 |
| 2017/0329289 A1* | 11/2017 | Kohn | ................ | G05B 13/0265 |

FOREIGN PATENT DOCUMENTS

| | | |
|---|---|---|
| JP | 2003-52083 | 2/2003 |
| JP | 2003-337853 | 11/2003 |
| JP | 3658587 | 6/2005 |
| JP | 2008-243073 | 10/2008 |
| JP | 2015-099492 | 5/2015 |
| TW | 201327201 | 7/2013 |

OTHER PUBLICATIONS

Written Opinion of the International Searching Authority dated Sep. 25, 2018 in International (PCT) Application No. PCT/JP2018/023618 with English translation.

\* cited by examiner

CONTROL SWITCHING DEVICE, PLANT, CONTROL SWITCHING METHOD AND PROGRAM

TECHNICAL FIELD

The present invention relates to a control switching device, a plant, a control switching method and a program.

The present application claims the benefit of priority on Japanese Patent Application No. 2017-124093 filed on Jun. 26, 2017, the subject matter of which is incorporated herein by reference.

BACKGROUND ART

Various technologies have been developed with respect to plant monitoring and controls. For example, Patent Document 1 discloses a remote operation system for power plants configured to remotely control power plants to start or stop its operation. This system includes a plurality of thermal power plants and a remote-control center. The thermal power plant has a function to control its elements according to operation signals input thereto via a communication terminal. The remote-control center is configured to access elements serving as control objects for each thermal power plant via a communication terminal, thus remotely controlling the operating status of each thermal power plant including the status of starting or stopping its operation.

Patent Document 2 discloses a plant service data server configured to provide information to a manager of a plant. The server is configured to receive and store information relating to operation data provided by a certain site and other operation data provided by a manager of a plant. In addition, the server is configured to register service information providing items. The server is further configured to acquire service information, i.e. processed data which are produced using data relating to the registered service information providing items among a plurality of operation data stored in an operation data storage means by a plurality of service information providers, thus transmitting service information to a manager of a plant.

CITATION LIST

Patent Literature Document

Patent Document 1: Japanese Patent Application Publication No. 2003-52083
Patent Document 2: Japanese Patent No. 3658587

SUMMARY OF INVENTION

Technical Problem

Due to advancement of technologies, it may be necessary to update plants in terms of controls. Even when a new control can be introduced into a plant, a new control would not be necessarily introduced into a plant due to some reasons. When a new plant control requires high introduction cost, for example, it would be assumed that a new plant control would not be necessarily introduced into a plant without any conclusive evidence to obtain an effect commensurate with its introduction cost.

On the other hand, it is preferable for a plant to introduce a new control (i.e. a control other than previously-used controls) with ease. Due to development of a control for improving the operating efficiency of a plant, for example, it is possible to improve the operating efficiency of a plant by updating its control.

The present invention aims to provide a control switching device, a plant, a control switching method and a program, by which it is possible to introduce a new control into a plant with relative ease.

Solution to Problem

In a first aspect of the present invention, a control switching device includes an operation input part configured to receive a switching operation as to whether to use or disuse a second control execution part configured to carry out a different control over a control object than a first control execution part configured to control the control object, and a control switching part configured to make a transition to a second control mode causing the second control execution part to control the control object according to an operation indicating the use of the second control execution part so as to stop the control of the first control execution part while having the second control execution part control the control object or to have the first control execution part and the second control execution part control the control object, or to make a transition to a first control mode causing the first control execution part to control the control object according to an operation indicating the disuse of the second control execution part so as to have the first control execution part control the control object while stopping the use of the second control execution part.

The control switching device may further includes a display configured to display an effect realized by controlling the control object in the second control mode.

The display may display the effect realized by controlling the control object in the second control mode in comparison with an effect realized by controlling the control object in the first control mode.

The display may display the operation result information based on the measurement data produced by controlling the control object in the first control mode and the operation result information based on the measurement data produced by controlling the control object in the second control mode.

The control switching device further includes a storage configured to store a history of operation parameters for the control object and the first operation history information representing the result of controlling the control object using the operation parameters included in the history of operation parameters in the first control mode, and a simulation execution part configured to calculate the second operation history information by executing a simulation of controlling the control object using the operation parameters included in the history of operation parameters in the second control mode. The display may display the first operation history information and the second operation history information.

The control switching device further includes a usage information acquisition part configured to acquire the usage information representing a degree of controlling the control object with the second control execution part, and a charging calculation part configured to calculate an amount of payment for the use of the second control execution part based on the usage information.

In a second aspect of the present invention, a plant includes a control object, a first control execution part configured to control the control object, a second control execution part configured to carry out a different control than the control of the first control execution part with respect to the control object, an operation input part configured to receive a switching operation as to whether to use or disuse the second control execution part, and a control switching part configured to make a transition to a second control mode causing the second control execution part to control the control object according to an operation indicating the use of the second control execution part so as to stop the control of the first control execution part while having the second control execution part control the control object or to have the first control execution part and the second control execution part control the control object, or to make a transition to a first control mode causing the first control execution part to control the control object according to an operation indicating the disuse of the second control execution part so as to have the first control execution part control the control object while stopping the use of the second control execution part.

The plant further includes an application generator configured to generate an application program for implementing the control of the second control mode, and an application installer configured to implement the control of the second control mode by installing the application program.

In a third aspect of the present invention, a control switching method includes the steps of: receiving a switching operation as to whether to use or disuse a second control execution part configured to carry out a different control over a control object than a first control execution part configured to control the control object, and making a transition to a second control mode causing the second control execution part to control the control object according to an operation indicating the use of the second control execution part so as to stop the control of the first control execution part while having the second control execution part control the control object or to have the first control execution part and the second control execution part control the control object, or a transition to a first control mode causing the first control execution part to control the control object according to an operation indicating the disuse of the second control execution part so as to have the first control execution part control the control object while stopping the use of the second control execution part.

In a fourth aspect of the present invention, a program causes a computer to implement the steps of: acquiring switching operation information representing a switching operation as to whether to use or disuse a second control execution part configured to carry out a different control over a control object than a first control execution part configured to control the control object, and making a transition to a second control mode causing the second control execution part to control the control object according to an operation indicating the use of the second control execution part so as to stop the control of the first control execution part while having the second control execution part control the control object or to have the first control execution part and the second control execution part control the control object, or a transition to a first control mode causing the first control execution part to control the control object according to an operation indicating the disuse of the second control execution part so as to have the first control execution part control the control object while stopping the use of the second control execution part.

Advantageous Effects of Invention

According to the aforementioned control switching device, the plant, the control switching method and the program, it is possible to introduce a new control into the plant with relative ease.

DESCRIPTION OF EMBODIMENTS

Hereinafter, the present invention will be described with reference to the embodiments, which may not necessarily limit the scope of the invention as defined in the appended claims. In addition, all the combinations of features described in the embodiments are not necessarily essential to the solving means of the invention.

First Embodiment

Figure 1:
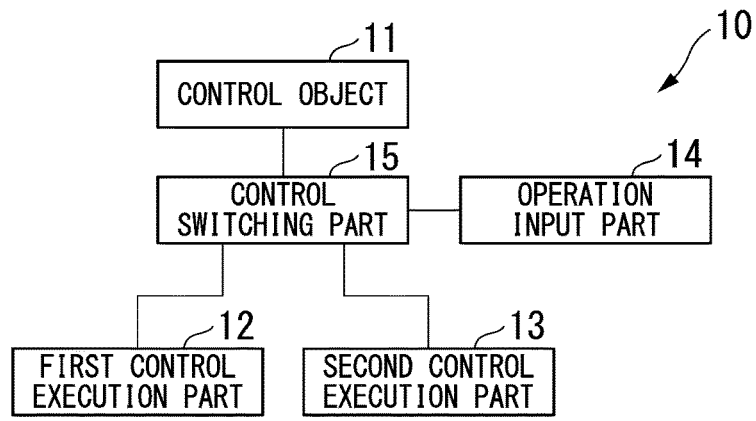
FIG. 1 is a block diagram showing the functional configuration of a plant according to the first embodiment of the present invention.

FIG. 1 is a block diagram showing the functional configuration of a plant according to the first embodiment of the present invention. As shown in FIG. 1, a plant 10 includes a control object 11, a first control execution part 12, a second control execution part 13, an operation input part 14, and a control switching part 15.

The plant 10 is a plant configured to control the control object 11 to operate. The control object 11 is not necessarily limited to a specific object. Therefore, the plant 10 is not necessarily limited to a specific type of plants.

The first control execution part 12 and the second control execution part 13 are both configured to control the control object 11. In this connection, the first control execution part 12 executes a different control than the second control execution part 13. In other words, the second control execution part 13 carries out a different control than the first control execution part 12 with respect to the control object 11.

A difference between controls executed by the first control execution part 12 and the second control execution part 13 is not necessarily limited to a specific type of differences. For example, the first control execution part 12 and the second control execution part 13 may execute different controls in terms of one or both of control logics and parameter values.

When the second control execution part 13 controls the control object 11, the second control execution part 13 may carry out an independent control (independently of the first control execution part 12), or the second control execution part 13 may cooperate with the first control execution part 12. For example, the second control execution part 13 may correct an output value of the first control execution part 12. Alternatively, the second control execution part 13 may correct an input value of the first control execution part 12.

The operation input part 14 is configured to input a user operation for switching as to whether to use or disuse the second control execution part 13.

According to the user operation input to the operation input part 14, the control switching part 15 switches between a first control mode to control objects by the first control execution part 12 and a second control mode to control objects by the second control execution part 13.

The control switching part 15 may switch to the second control execution part 13 to control the control object 11 in the transition to the second control mode causing the second control execution part 13 to control the control object 11 according to a user operation instruction indicating the use of the second control execution part 13. In this case, as described above, the first control execution part 12 and the second control execution part 13 may cooperate to control the control object 11, or the second control execution part 13 may control the control object 11 by stopping the first control execution part 12.

On the other hand, the control switching part 15 may switch to the first control execution part 12 to control the control object 11 while stopping the second control execution part 13 in the transition to the first control mode causing the first control execution part 12 to control the control object 11 according to a user operation indicating the use of the first control execution part 12.

In this connection, the operation input part 14 and the control switching part 15 may be combined together to constitute a control switching device.

As described above, the operation input part 14 receives a switching operation as to whether to use or disuse the second control execution part 13. According to a user operation indicating to use the second control execution part 13, the control switching part 15 may switch to the second control execution part 13 to control the control object 11, or it may instruct both the first control execution part 12 and the second control execution part 13 to control the control object 11. According to a user operation indicating to disuse the second control execution part 13, the control switching part 15 may instruct the first control execution part 12 to control the control object 11 while stopping the second control execution part 13.

As described above, a user may experimentally use the second control execution part 13 by means of the control switching part 15 configured to carry out a switching operation as to whether to use or disuse the second control execution part 13 according to a user operation. For this reason, a user may determine whether or not to introduce the second control execution part 13 by experimentally using the second control execution part 13. In this connection, it is possible for the plant 10 to introduce a new control executed by the second control execution part 13 with relative ease.

Upon obtaining a good result when using the second control execution part 13, for example, a user may constantly use the second control execution part 13, or a user may spontaneously use the second control execution part 13 according to needs. Due to a failure of obtaining a good result when using the second control execution part 13, a user may suppress the use of the second control execution part 13. In other words, a user may inhibit the second control execution part 13 from controlling the control object 11.

Due to a separation of functionality between the first control execution part 12 and the second control execution part 13, it is possible to flexibly set a charging system to use the second control execution part 13. In particularly, it is possible to implement a usage-rate charging system with respect to the use of the second control execution part 13.

For example, a provider of the second control execution part 13 may charge a user an amount of payment for the used time of the second control execution part 13. Alternatively, a provider of the second control execution part 13 may charge a user an amount of payment according to quantitative evaluation of an effect obtained by using the second control execution part 13. The above effect may be a pecuniary effect such as a fuel cost reduction effect due to an improved efficiency of operations, i.e. pecuniary benefits. In addition, it is possible to charge an amount of payment based on the number of calculations of the second control execution part 13 or the amount of transmission data representing results of calculations.

According to the usage-rate charging system for the use of the second control execution part 13 compared to the distribution of devices sold as the second control execution part 13, it is possible to reduce initial costs. In this connection, it is possible for the plant 10 to introduce a new control executed by the second control execution part 13 with relative ease.

Second Embodiment

The second embodiment will explain a concrete example of the first embodiment.

Figure 2:
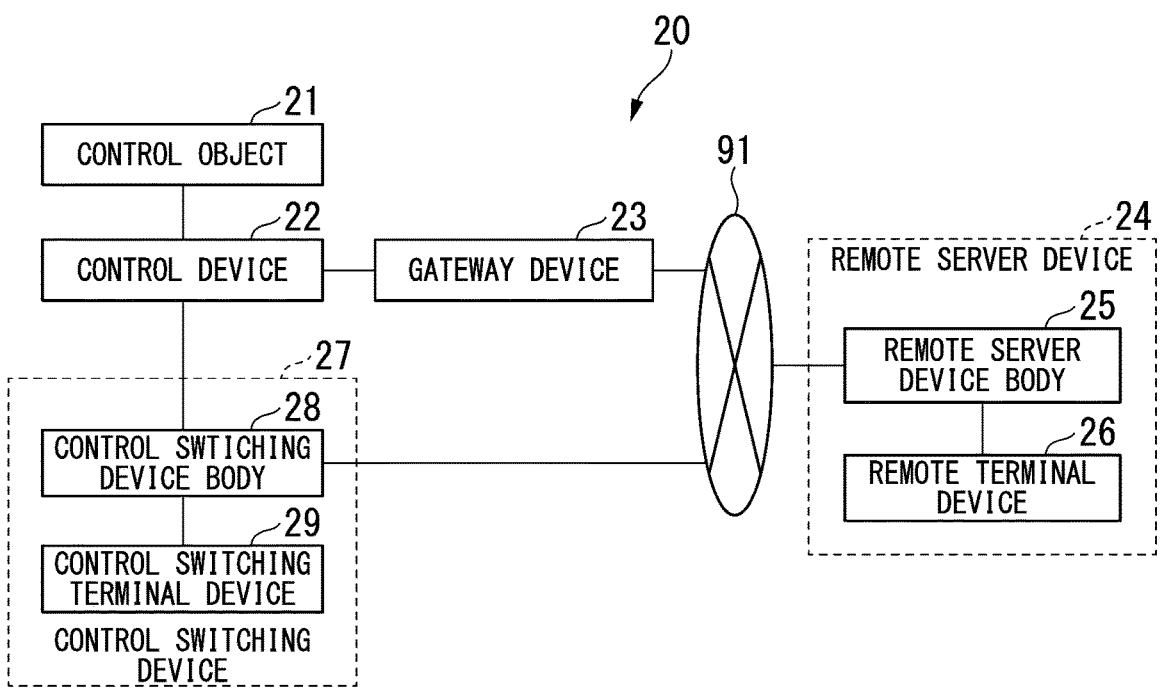
FIG. 2 is a configuration diagram showing configurations of devices in a power plant according to the second embodiment of the present invention.

FIG. 2 is a block diagram showing configurations of devices in a power plant according to the second embodiment of the present invention. As shown in FIG. 2, a power plant 20 includes a control object 21, a control device 22, a gateway device 23, a remote server device body 25, a remote terminal device 26, a control switching device body 28, and a control switching terminal device 29.

The remote server device body 25 and the remote terminal device 26 will be collectively referred to as a remote server device 24. The control switching device body 28 and the control switching terminal device 29 will be collectively referred to as a control switching device 27.

In addition, the gateway device 23, the remote server device 24, and the control switching device body 28 are connected to a communication network 91. The control device 22 is connected to the communication network 91 by way of the gateway device 23.

The power plant 20 is a gas-turbine power plant configured to generate power using combustion of fuel gas in a gas turbine. In this connection, the power plant 20 may be another plant other than a gas-turbine power generation plant. For example, the power plant 20 may be other types of plants such as machine manufacturing plants other than power plants. In addition, the power plant 20 may be a power plant other than a thermal power plant or a thermal power plant using other types of fuel than fuel gas. Even when the power plant 20 is a thermal power plant using fuel gas, it is possible to use a power plant independently using a gas turbine or a combined-cycle power plant. The power plant 20 exemplifies the plant 10 in FIG. 1.

The control object 21 is a controlled object in the power plant 20. The following descriptions refer to an example of the control object 21 serving as a gas-turbine power generation unit; however, the control object 21 of the power plant 20 is not necessarily limited to the power generation unit. The control object 21 exemplifies the control object 11 in FIG. 1.

Figure 3:
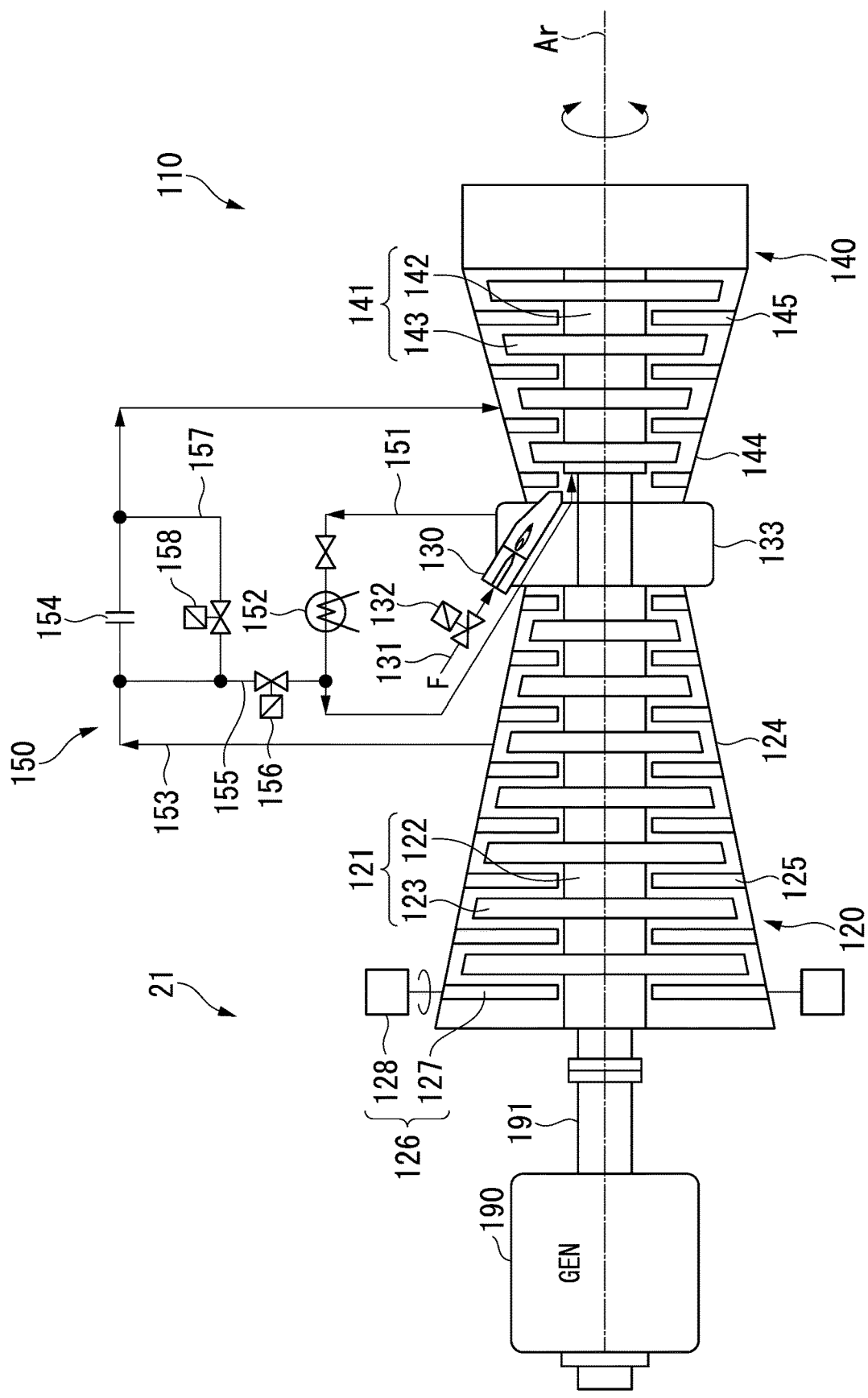
FIG. 3 is a schematic diagram showing the configuration of a control object according to the second embodiment.

FIG. 3 is a schematic diagram showing the configuration of the control object 21. As shown in FIG. 3, the control object 21 includes a gas turbine 110, and a power generator 190 configured to generate power when driven by the gas turbine 110.

The gas turbine 110 includes a compressor 120 configured to generate compressed air by compressing external air, a combustor 130 configured to generate high-temperature combustion gas by burning fuel F in the compressed air provided by the compressor 120, a turbine 140 to be driven by combustion gas provided by the combustor 130, and a cooling system 150 configured to cool constituent parts of the gas turbine 110.

The compressor 120 includes a compressor rotor 121 configured to rotate about an axial line Ar serving as a center, a compressor casing 124 configured to cover the compressor rotor 121, a stationary-blade lane 125 including a plurality of stationary blades, and an IGV (Inlet Guide Vane) 126 disposed at an inlet port of the compressor casing 124.

The compressor rotor 121 includes a rotor shaft 122 which extends in an axial direction about the axial line Ar, and a moving-blade lane 123 including a plurality of moving blades attached to the rotor shaft 122.

The IGV 126 includes a plurality of guide vanes 127, and a driver 128 configured to drive a plurality of guide vanes 127. The IGV 126 is configured to regulate a flow rate of air sucked into the compressor casing 124.

The turbine 140 includes a turbine rotor 141 configured to rotate about the axial line Ar due to combustion gas provided by the combustor 130, a turbine casing 144 configured to cover the turbine rotor 141, and a stationary-blade lane 145 including a plurality of stationary blades.

The turbine rotor 141 includes a rotor shaft 142 which extends in an axial direction about the axial line Ar, and a moving-blade lane 143 including a plurality of moving blades attached to the rotor shaft 142.

The compressor rotor 121 and the turbine rotor 141 are disposed along the same axial line Ar and connected together to form a gas-turbine rotor. The gas-turbine rotor is connected to a rotor 191 of the power generator 190. The rotation of the turbine rotor 141 due to combustion gas provided by the combustor 130 may cause the compressor rotor 121 and the generator rotor 191 to rotate about the axial line Ar. Due to the rotation of the compressor rotor 121, the compressor 120 compresses air to supply compressed air to the combustor 130. Due to the rotation of the generator rotor 191, the power generator 190 generates power.

The gas turbine 110 is further equipped with an intermediate casing 133 interposed between the compressor casing 124 and the turbine casing 144. The combustor 130 is attached to the intermediate casing 133. The compressor casing 124, the intermediate casing 133, and the turbine casing 144 are connected together to form a gas-turbine casing.

A fuel line 131 configured to supply the fuel F, provided from a fuel supply source, to the combustor 130 is connected to the combustor 130. A fuel-regulating valve 132 configured to regulate a flow rate of the fuel F flowing into the combustor 130 is attached to the fuel line 131.

The cooling system 150 includes a high-pressure bleeding line 151, a refrigerator 152, a low-pressure bleeding line 153, an orifice 154, an interconnect line 155, a first flow regulating valve 156, a bypass line 157, and a second flow regulating valve 158. The high-pressure bleeding line 151 feeds compressed air of the compressor 120 into the turbine rotor 141. The refrigerator 152 cools air flowing through the high-pressure bleeding line 151. The low-pressure bleeding line 153 feeds bleeding air from the compressor 120 to the stationary-blade lane 145 of the turbine 140. The orifice 154 limits a flow rate of air flowing through the low-pressure bleeding line 153. The interconnection line 155 connects the high-pressure bleeding line 151 and the low-pressure bleeding line 153 together. Th first flow regulating valve 156 is attached to the interconnect line 155. The second flow regulating valve 158 configured to connect the interconnect line 155 and the low-pressure bleeding line 153 together is attached to the bypass line 157.

In the cooling system 150 having the above configuration, the refrigerator 152 cools the compressed air bled by the high-pressure bleeding line 151, and then the cooled compressed air is fed to the turbine rotor 141 to thereby cool the turbine rotor 141.

In the cooling system 150, the compressed air bled by the low-pressure bleeding line 153 is expanded and reduced in temperature by the orifice 154. The cooling system 150 feeds the air having reduced temperature to the stationary-blade lane 145 of the turbine 140 to thereby cool the stationary-blade lane 145. This air is fed to a disk cavity, i.e. a space formed between the stationary-blade lane 145 and the turbine rotor 141, through the stationary-blade lane 145.

By opening the second flow regulating valve 158 attached to the bypass line 157, it is possible to reduce a flow rate of air flowing through the orifice 154 and to thereby decrease a temperature reduction of the air flowing into the turbine 140. By adjusting the opening of the second flow regulating valve 158, it is possible to adjust disk cavity temperature (DCT).

The control device 22 controls the control object 21 to generate power. For example, the control device 22 can be configured of an EWS (Engineering Workstation) or a PLC (Programmable Logic Controller).

In addition, the control device 22 is configured to transmit various pieces of information, relating to the operation of the control object 21, to the remote server device 24. For example, the control device 22 is configured to acquire measurement data such as atmospheric temperature representing the operating environment of the control object 21 in order to control the control object 21, and therefore the control device 22 transmits the acquired data to the remote server device 24. In addition, the control device 22 is configured to acquire data such as turbine speed representing the status of the control object 21 in order to control the control object 21, and therefore the control device 22 transmits the acquired data to the remote server device 24. Moreover, the control device 22 transmits data such as operation mode information of the control object 21, representing the status of the control object 21 controlled by the control device 22, to the remote sever device 24.

Figure 4:
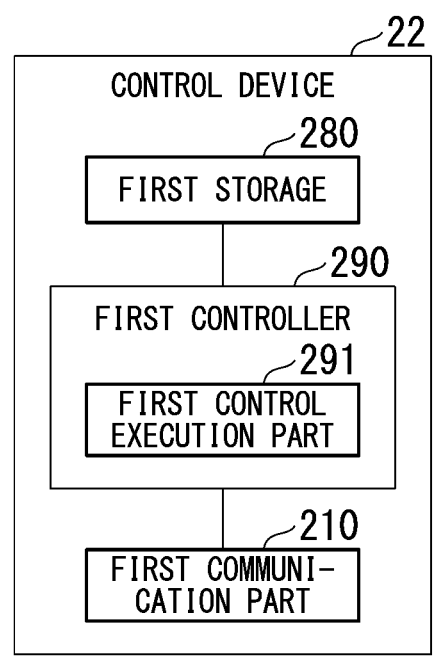
FIG. 4 is a block diagram showing the configuration of a control device according to the second embodiment.

FIG. 4 is a block diagram showing the functional configuration of the control device 22. As shown in FIG. 4, the control device 22 includes a first communication part 210, a first storage 280, and a first controller 290. The first controller 290 further includes a first control execution part 291.

The first communication part 210 is configured to communicate with other devices. In particular, the first communication part 210 receives measurement data representing the operating environment of the control object 21 and data representing the status of the control object 21, which are transmitted thereto from sensors attached to the control object 21. In addition, the first communication part 210 transmits a control signal used to control the control object 21 to the control object 21. Moreover, the first communication part 210 transmits various pieces of information relating to the operation of the control object 21 to the remote server device 24.

The first storage 280 is configured to store various pieces of information. The first storage 280 is configured of a storage device installed in the control device 22.

The first controller 290 carries out various functions by controlling various parts of the control device 22. The first controller 290 is realized by a CPU (Central Processing Unit) of the control device 22 configured to read and execute programs.

The first control execution part 291 controls the control object 21. Specifically, the first control execution part 291 is configured to execute control programs for controlling the control object 21. Due to execution of control programs, the first control execution part 291 controls the first communication part 210 to transmit a control signal to the control object 21. The first control execution part 291 exemplifies the first control execution part 12 of FIG. 1.

The gateway device 23 has a function of an interface for the control device 22 to communicate with the remote server device 25. In addition, the gateway device 23 has a function of a firewall to provide a communication security to the control device 22.

The remote server device 24 is a device configured to generate a new control for the control object 21.

The new control is configured of control programs for modifying at least part of an original control by which the control device 22 controls the control object 21 to generate power. The new control may differ from the original control of the control device 22 in terms of at least one of control logics and parameter values or both of control logics and parameter values.

The remote server device 24 may automatically generate a new control, or the remote server device 24 may provide an environment having a user generate a new control. The remote server device 24 receives from the control device various pieces of information relating to the operation of the control object 21 as information to generate a new control.

The remote server device body 25 executes processes such as calculations to realize a function to generate a new control for the control object 21. For example, the remote server device body 25 is configured of a computer such as a workstation.

Figure 5:
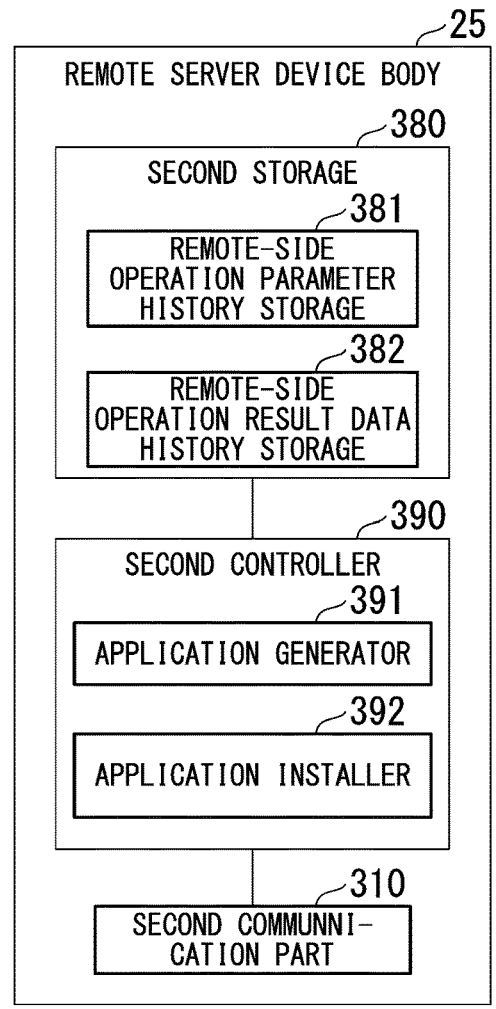
FIG. 5 is a block diagram showing the functional configuration of a remote server device body according to the second embodiment.

FIG. 5 is a block diagram showing the functional configuration of the remote server device body 25. As shown in FIG. 5, the remote server device body 25 includes a second communication part 310, a second storage 380, and a second controller 390. The second storage 380 further includes a remote-side operation parameter history storage 381 and a remote-side operation result data history storage 382. The second controller 390 further includes an application generator 391 and an application installer 392.

The second communication part 310 is configured to communicate with other devices. In particular, the second communication part 310 receives from the first communication part 210 various pieces of information relating to the operation of the control object 21. In addition, the second communication part 310 communicates with the remote terminal device 26. The second communication part 310 receives a user-operation signal received by the remote terminal device 26 from the remote terminal device 26, and therefore the second communication part 310 transmits to the remote terminal device 26 an instruction signal which instructs the remote terminal device 26 to display an image and to output a sound.

The second storage 380 is configured to store various pieces of information. The second storage 380 is configured of a storage device installed in the remote server device body 25.

The remote-side operation parameter history storage 381 is configured to store a history of operation parameters. Herein, operation parameters refer to various pieces of information relating to the operation of the control object 21. The history of operation parameters corresponds to time-series data of operation parameters. For example, operation parameters may include information relating to the operating environment of the power plant 20 such as atmospheric pressure, information relating to a control value of the power plant 20 such as an inlet flow rate, and information relating to the status of the power plant 20 such as a valve opening.

The remote-side operation result data history storage 382 is configured to store a history of operation result data. Herein, the history of operation result data corresponds to time-series data representing results of the control device 22 to control the control object 21. In this connection, it is possible to use various results indicated by the history of operation result data. For example, the history of operation result data may represent an amount of power generation or efficiency of power generation. Alternatively, the history of operation result data may represent a NOx emission. Or, the history of operation result data may represent a plurality of data items.

The second controller 390 executes various functions by controlling various parts of the remote server device body 25. The first controller 290 is configured by a CPU of the control device 22 to read and execute programs on the first storage 280.

The application generator 391 generates control programs to carry out a new control for the control object 21. Hereinafter, control programs will be referred to as application programs or simply as applications.

The application generator 391 may automatically generate application programs, or a user of the remote server device 24 may provide an environment to generate application programs. To automatically generate application programs, the application generator 391 may generate application programs with reference to the history of operation parameters and the history of operation result data. For example, the application generator 391 may extract a plurality of histories having a higher evaluation than a predetermined condition among operation result data histories while extracting common features representing plant conditions successfully obtaining operation results, and therefore the application generator 391 may generate application programs realizing the extracted features.

The application installer 392 installs application programs in the control switching device 27. By executing application programs installed in the control switching device 27, it is possible for the control switching device 27 to carry out a different control than a control of the control device 22 with respect to the control object 21.

The application installer 392 may automatically install application programs in the control switching device 27. Alternatively, the application installer 392 may install application programs in the control switching device 27 according to a user operation. In other words, the application installer 392 may manually or semi-automatically install application programs in the control switching device 27.

The remote terminal device 26 has a function of a human interface for the remote server device 24. For example, the remote terminal device 26 is configured of a computer such as a personal computer (PC).

Figure 6:
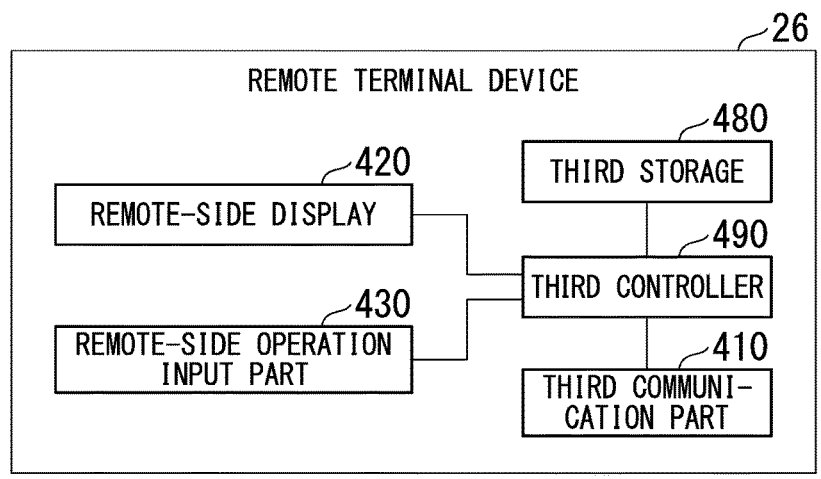
FIG. 6 is a block diagram showing the functional configuration of a remote terminal device according to the second embodiment.

FIG. 6 is a block diagram showing the functional configuration of the remote terminal device 26. As shown in FIG. 6, the remote terminal device 26 includes a third communication part 410, a remote-side display 420, a remote-side operation input part 430, a third storage 480, and a third controller 490.

The third communication part 410 is configured to communicate with other devices. In particular, the third communication part 410 communicates with the second communication part 310 of the remote server device body 25. The third communication part 410 receives instruction signals, which may cause an image display and a sound output, from the second communication part 310. In addition, the third communication part 410 transmits to the second communication part 310 a signal representing a user operation received by the remote terminal device 26.

For example, the remote-side display 420 is equipped with a display screen for displaying various images such as a liquid-crystal panel or a LED (Light-Emitting Diode) panel. When a user generates application programs, for example, the remote-side display 420 may display an editor for programming.

For example, the remote-side operation input part 430 is equipped with an input device to input a user operation such as a keyboard and a mouse. When a user generates application programs, for example, the remote-side operation input part 430 may input a user operation applied to a programming editor. When the application installer 392 of the remote server device body 25 installs application programs in the control switching device 27 according to a user operation, the remote-side operation input part 430 may input a user operation indicating installation of application programs.

The third storage 480 is configured to store various pieces of information. The third storage 480 is configured of a storage device installed in the remote terminal device 26.

The third controller 490 executes various functions by controlling various parts of the remote terminal device 26. In particular, the third controller 490 controls the remote-side display 420 to display an image indicated by an instruction signal for instructing an image display which the third communication part 410 receives from the remote server device body 25. In addition, the third controller 490 controls the third communication part 410 to transmit a signal, representing a user operation input to the remote-side operation input part 430, to the remote server device body 25.

The third controller 490 is realized by a CPU of the remote-side operation input part 430 to read and execute programs from the third storage 480.

The control switching device 27 carries out a switching operation as to whether or not to change the control of the control object 21 under the control device 22 with another control realized by executing application programs. Accordingly, the control switching device 27 changes at least part of the control of the control object 21 under the control device 22 with another control realized by executing application programs.

The control switching device body 28 executes processes such as calculations to switch controls. For example, the control switching device body 28 is configured of a computer such as an EWS.

Figure 7:
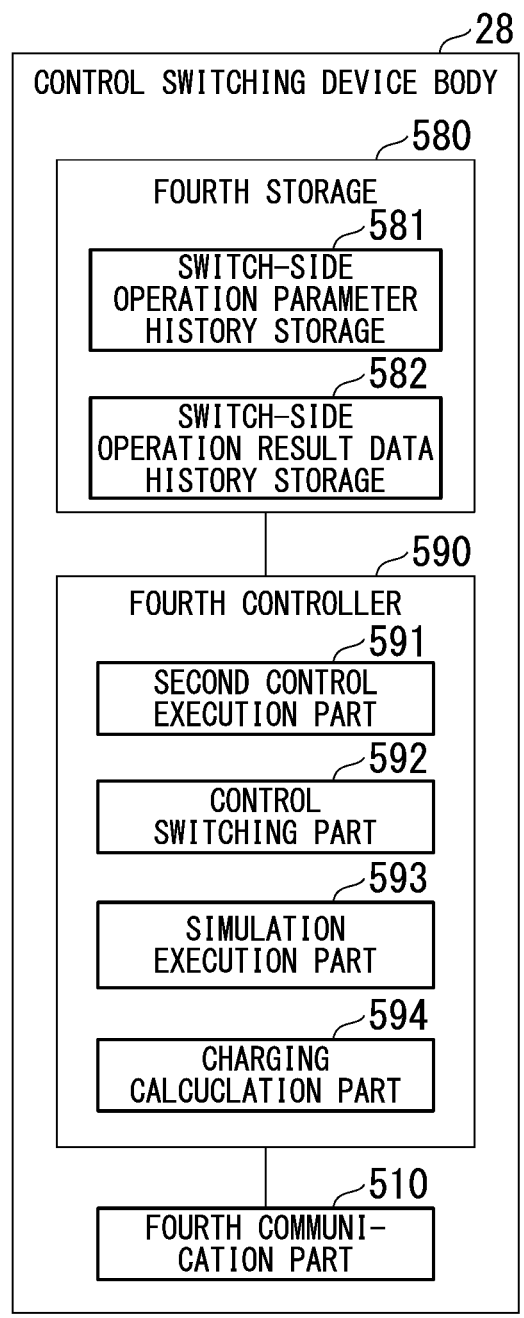
FIG. 7 is a block diagram showing the functional configuration of a control switching device body according to the second embodiment.

FIG. 7 is a block diagram showing the functional configuration of the control switching device body 28. As shown in FIG. 7, the control switching device body 28 includes a fourth communication part 510, a fourth storage 580, and a fourth controller 590. The fourth storage 580 further includes a switch-side operation parameter history storage 581 and a switch-side operation result data history storage 582. The fourth storage 590 further includes a second control execution part 591, a control switching part 592, a simulation execution part 593, and a charging calculation part 594.

The fourth communication part 510 is configured to communicate with other devices. In particular, the fourth communication part 510 receives application programs and instruction signals instructing installment of application programs from the second communication part 310 of the remote server device body 25.

The fourth communication part 510 exemplifies an operation parameter acquisition part, which is configured to acquire operation parameters, used for controlling the control object 21, from the control device 22. Operation parameters used for controlling the control object 21 are includes in various pieces of information relating to the operation of the control object 21, which are transmitted from the first communication part 210. Operation parameters are used for simulation of the control of the control object 21 by executing application programs with the control switching device body 28.

In addition, the fourth communication part 510 is configured to acquire first operation result information. Herein, the first operation result information is the information representing the result of the first control execution part 291 controlling the control object 21. The first operation result information is included in various pieces of information relating to the operation of the control object 21, which are transmitted from the first communication part 210.

The fourth communication part 510 exemplifies a usage information acquisition part, which is configured to acquire usage information. Herein, the usage information is the information representing a degree of control of the second control execution part 591 controlling the control object 21. That is, the usage information is the information representing a degree of using the control of the second control execution part 591 to be used by an operator of the control object 21. For example, the usage information may be the used time information representing the time in which the second control execution part 591 of the control switching device body 28 is controlling the control object 21 or an amount of transmission data indicating the number of calculations or calculation results made by the second control execution part 591. Alternatively, the usage information may be the usage effect information quantitatively representing an effect which is produced by the second control execution part 591 controlling the control object 21. The aforementioned effect may be a pecuniary effect, i.e. pecuniary benefits. The usage information is used to calculate an amount of payment to be charged when using the control of the second control execution part 591.

The fourth storage 580 is configured to store various pieces of information. The fourth storage 580 is configured of a storage device installed in the control switching device body 28.

The switch-side operation parameter history storage 581 is configured to store a history of operation parameters. As described above, operation parameters are data used for controlling the control object 21.

The switch-side operation result data history storage 582 is configured to store first operation history information. Herein, the first operation history information is the information representing the result of controlling the control object 21 using the history of operation parameters stored on the switch-side operation parameter history storage 581. Specifically, the first operation history information is the history information collecting a time series of first operation result information received by the fourth communication part 510 in a duration of operation parameters stored on the switch-side operation parameter history storage 581.

The fourth storage 580 including the switch-side operation parameter history storage 581 and the switch-side operation result data history storage 582 exemplifies a storage configured to store a history of operation parameters and the first operation history information.

The fourth controller 590 is configured to execute various processes by controlling various parts of the control switching device body 28. The fourth controller 590 is realized by a CPU of the control switching device body 28 reading and executing programs from the fourth storage 580.

The second control execution part 591 carries out a different control than the control of the first control execution part 291 with respect to the control object 21. The second control execution part 591 exemplifies the second control execution part 13 of the first embodiment.

A difference between the control of the first control execution part 291 and the control of the second control execution part 591 is not necessarily limited to a specific difference. For example, the first control execution part 291 and the second control execution part 591 may carry out different controls in terms of one of control logics and parameter values or both of control logics and parameter values.

To control the control object 21, the second control execution part 591 may solely control the control object 21 (independently of the first control execution part 291), or the second control execution part 591 may cooperate with the first control execution part 291 to control the control object 21. For example, the second control execution part 591 may correct the output value of the first control execution part 291. Alternatively, the second control execution part 591 may correct the input value of the first control execution part 291.

In this connection, application programs are programs implementing the function of the second control execution part 591. Accordingly, a decision as to whether to use or disuse application programs may correspond to a decision as to whether to use or disuse the second control execution part 591.

The control switching part 592 switches its operation control mode between the control of the first control execution part 291 and the control of the second control execution part 591 according to a user operation received by the control switching terminal device 29. The control switching part 592 exemplifies the control switching part 15 of the first embodiment.

Due to the transition to the second control mode which allows the second control execution part 591 to control the control object 21 according to a user operation indicating the use of the second control execution part 591, the control switching part 592 causes the second control execution part 591 to control the control object 21. In this case, as described above, the first control execution part 291 and the second control execution part 591 may cooperate together to control the control object 21, or the second control execution part 591 may control the control object 21 while stopping the control of the first control execution part 291.

Due to the transition to the first control mode which allows the first control execution part 291 to control the control object 21 according to a user operation indicating the disuse of the second control execution part 591, the control switching part 592 causes the first control execution part 291 to control the control object 21 while stopping the control of the second control execution part 591.

The simulation execution part 593 carries out simulation due to the transition to the second control mode, i.e. the operation control mode which allows the second control execution part 591 to control the control object 21. In the first control mode which allows the first control execution part 291 to control the control object 21, the simulation execution part 593 carries out simulation according to the second control mode which causes the second control execution part 591 to control the control object 21, and therefore it is possible to present a user with a combination of the result of the control of the first control execution part 291 in the first control mode and the result of the control of the second control execution part 591 in the second control mode. The user receiving presentation may compares the control result of the first control execution part 291 in the first control mode and the control result of the second control execution part 591 in the second control mode so as to review an advantage of introducing the control of the second control execution part 591 in the second control mode, thus determining whether or not to introduce the control of the second control execution part 591 in the second control mode.

In the first control mode in which the first control execution part 291 controls the control object 21, for example, the simulation execution part 593 may simulate the control of the second control execution part 591 in the second control mode in real time according to the current environment information of the control object 21 and the current status information of the control object 21. Accordingly, it is possible to provide a user with a combination of the control result of the first control execution part 291 in the first control mode and the simulation result of the second control execution part 591 in the second control mode.

Alternatively, the simulation execution part 593 may simulate the second control execution part 591 controlling the control object 21 in the second control mode using a history of operation parameters, thus calculating second operation history information representing the simulation result. Accordingly, it is possible to provide a user with a combination of the first operation history information, representing the control result of the first control execution part 291 controlling the control object 21 in the first control mode, and the second operation history information, representing the simulation result of the second control execution part 591 controlling the control object 21 in the second control mode, in a duration relating to a history of operation parameters.

The charging calculation part 594 calculates an amount of payment against the use of the second control execution part 591 based on the usage information. As described above, the usage information represents a degree of controlling the control object 21 with the second control execution part 591.

Accordingly, it is possible to implement the usage-rate charging with respect to the use of the second control execution part 591. Therefore, it is possible to provide various options such as other sales plans and charging plans without limited to sales planning to sell the second control execution part 591 as an independent device.

The control switching terminal device 29 has a function of a human interface for the control switching device 27. For example, the control switching terminal device 29 is configured of a computer such as an EWS.

Figure 8:
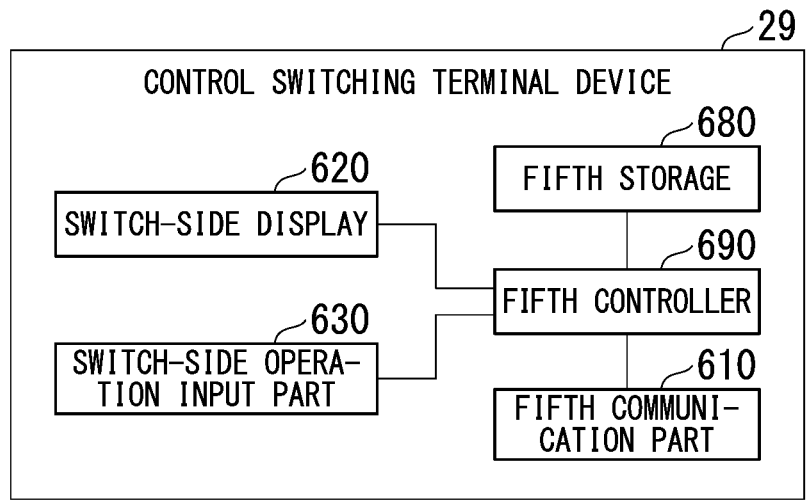
FIG. 8 is a block diagram showing the functional configuration of a control switching terminal device according to the second embodiment.

FIG. 8 is a block diagram showing the functional configuration of the control switching terminal device 29. As shown in FIG. 8, the control switching terminal device 29 includes a fifth communication part 610, a switch-side display 620, a switch-side operation input part 630, a fifth storage 680, and a fifth controller 690.

The fifth communication part 610 is configured to communicate with other devices. In particular, the fifth communication part 610 communicates with the fourth communication part 510 of the control switching device body 28. The fifth communication part 610 receives instruction signals, indicating an image display and a sound output, from the fourth communication part 510. In addition, the fifth communication part 610 transmits a signal, representing a user operation received by the control switching terminal device 29, to the fourth communication part 510.

For example, the switch-side display 620 is equipped with a display screen such as a liquid-crystal panel or a LED panel to display various images.

In particular, the switch-side display 620 is configured to display an effect of the second control execution part 591 controlling the control object 21 under the control switching part 592. The switch-side display 620 may display the effect of the second control execution part 591 controlling the control object 21 under the control switching part 592 in comparison with an effect of the first control execution part 291 controlling the control object 21 while stopping the control of the second control execution part 591.

The switch-side display 620 may concurrently display the control results of the first control execution part 291 and the second control execution part 591 actually controlling the control object 21. Specifically, the switch-side display 620 may concurrently display the operation result information based on actual measurement data of the first control execution part 291 controlling the control object 21 and the operation result information based on actual measurement data of the second control execution part 591 controlling the control object 21.

The switch-side display 620 may display the control result of the first control execution part 291 and the simulation result of the control of the second control execution part 591 in real time. Specifically, the switch-side display 620 may concurrently display the first operation result information, representing the control result of the first control execution part 291 controlling the control object 21 using operation parameters, and the second operation result information representing the control result of the second control execution part 591 controlling the control object 21 using operation parameters.

Alternatively, the switch-side display 620 may concurrently display the first operation result information, representing a history of results relating to the control of the first control execution part 291, second operation history information representing a history of results relating to the control of the second control execution part 591. In this case, it is possible to use the second operation history information as the simulation result information which the simulation execution part 593 produces by executing simulation using a history of operation parameters. The switch-side display 620 exemplifies a display.

For example, the switch-side operation input part 630 is equipped with an input device such as a keyboard and a mouse to receive a user operation. In particular, the switch-side operation input part 630 exemplifies an operation input part to receive a switching operation as to whether to use or disuse the second control execution part 591.

The fifth storage 680 is configured to store various pieces of information. The fifth storage 680 is configured of a storage device installed in the control switching terminal device 29.

The fifth controller 690 executes various functions by controlling various parts of the control switching terminal device 29. In particular, the fifth controller 690 controls the switch-side display 620 to display an image according to a image-display instruction signal which the fifth communication part 610 receives from the control switching device body 28. In addition, the fifth controller 690 controls the fifth controller 610 to transmit a signal, representing a user operation input to the switch-side operation input part 630, to the control switching device body 28.

The communication network 91 relays communications among devices connected to the communication network 91. In particular, the communication network 91 relays a communication between the control device 22 and the remote server device body 25 and a communication between the control switching device body 28 and the remote server device body 25.

The communication network 91 is not necessarily limited to a specific type of communication networks. For example, the communication network 91 may be the Internet, or the communication network 91 may be a private communication network dedicated to the power plant 20.

The configuration of communication paths laid among the control device 22, the remote server device body 25, and the control switching device body 28 is not necessarily limited to the configuration shown in FIG. 2 in which the control device 22 is connected to the communication network 91 through the gateway device 23 while the remote server device body 25 and the control switching device body 28 are directly connected to the communication network 91. For example, both the control device 22 and the control switching device body 28 may be connected to the communication network 91 through the gateway device 23.

FIG. 2 shows a configuration example in particular improving security for communications of the control device 22 such that the control device 22 is connected to the communication network 91 through the gateway device 23. The control device 22 is able to control the control object 21 by itself without needing cooperation with the control switching device 27. Therefore, it is possible to continue the operation of the control object 21 as long as the control device 22 operates normally irrespective of any failures occurring in the control switching device 27.

In this connection, the gateway 23 may allow a communication signal, which is sent from the control device 22 to the communication network 91, to pass therethrough while disallowing (or disabling) a communication signal, which is sent from the communication network 91 to the control device 22, to pass therethrough. Accordingly, it is possible to reduce a possibility of occurrence of any attacks against the control device 22 or any failures in the control device 22.

Next, an example of the operation of the second control execution part 591 configured to change a valve opening will be described below.

Without using application programs to change a control value such as a valve opening, for example, the first control execution part 291 determines a valve opening based on atmospheric temperature and a power-generator output.

Upon using application programs, for example, the first control execution part 291 determines whether or not to change a valve opening based on measurement data of temperature and vibration (e.g. combustion vibration) at various parts of the control object 21 in addition to the atmospheric temperature and the power-generator output.

Upon determining that a valve opening is changeable, the second control execution part 591 calculates a variation of a valve opening so as to transmit it to the control device 22 through the fourth communication part 510. In the control device 22, the first control execution part 291 changes the valve opening by its own control based on the variation calculated by the second control execution part 591.

By changing the valve opening as described above, the present embodiment aims to improve the performance and the operability of the control object 21.

As a valve to be changed in its valve opening, for example, it is possible to mention a flow regulating valve for DCT control (e.g. the second flow regulating valve 158 in the case of FIG. 3); but this is not a restriction. In addition, a device to be changed in its opening is not necessarily limited to valves. For example, the second control execution part 591 may change an opening of the IGV (e.g. the IGV 126 in the case of FIG. 3).

To display an improvement effect without using application programs, the simulation execution part 593 may theoretically calculate a performance improvement value based on a variation of a valve opening which would be predicted when using application programs. Subsequently, the switch-side display 620 of the control switching terminal device 29 may display the performance improvement value calculated by the simulation execution part 593.

Figure 9:
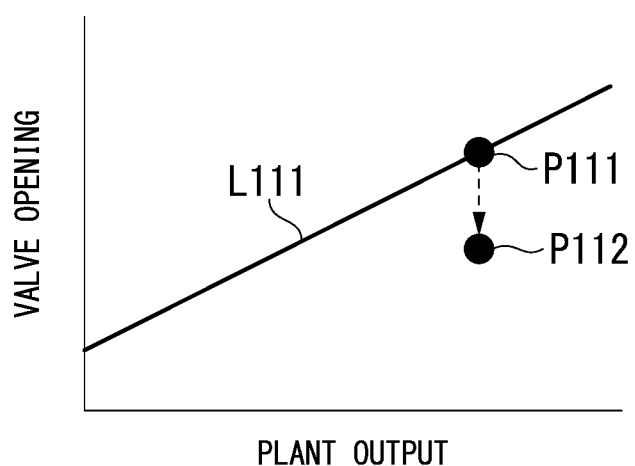
FIG. 9 is a graph showing an example of modifying a valve opening with a second control execution part according to the second embodiment.

FIG. 9 is a graph showing an example of variations of a valve opening with the second control execution part 591. The horizontal axis of FIG. 9 shows "PLANT OUTPUT". The vertical axis shows "VALVE OPENING".

A line L111 exemplifies a relationship between a plant output and a valve opening of a valve controlled by the first control execution part 291. In the case of FIG. 9, the first control execution part 291 determines a valve opening based on a plant output.

A point P111 exemplifies a valve opening determined by the first control execution part 291. A point P112 exemplifies a point representative of a valve opening determined by the second control execution part 591. At the same plant output, the second control execution part 591 sets a smaller valve opening than the first control execution part 291.

The second control execution part 591 may calculate a correction value against a valve opening determined by the first control execution part 291, or the second control execution part 591 may calculate a valve opening independently of the first control execution part 291.

The switch-side display 620 may display a prediction value of performance improvement with respect to the control object 21 controlled by the second control execution part 591.

Figure 10:
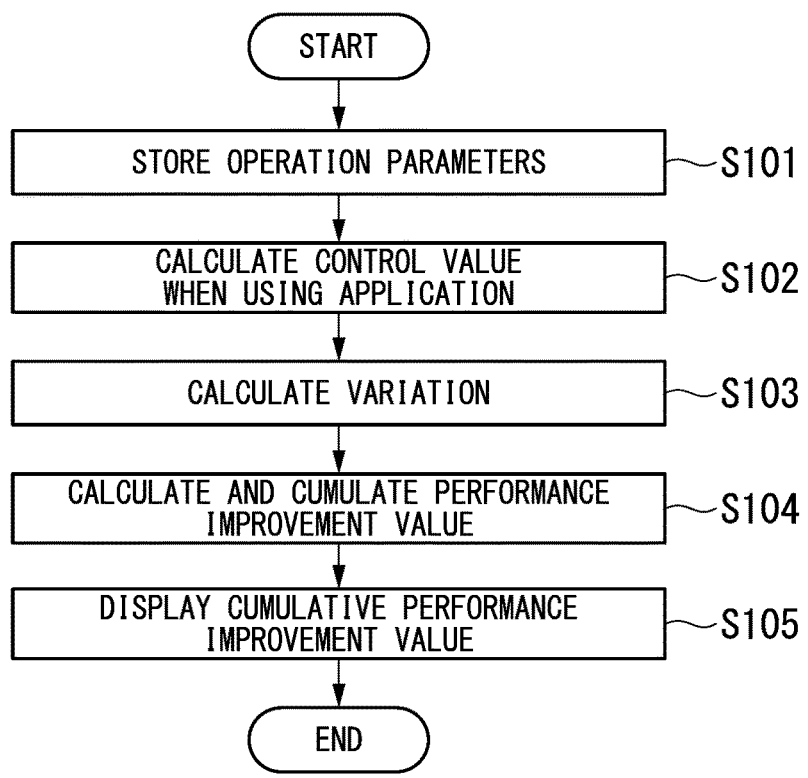
FIG. 10 is a flowchart showing an operation example of a power plant for displaying prediction values of performance improvements of control objects controlled by the second control execution part on a switching-side display according to the second embodiment.

FIG. 10 is a flowchart showing an operation example of the power plant 20 in which the switch-side display 620 displays a prediction value of performance improvement with respect to the control object 21 controlled by the second control execution part 591.

(Step S101)
When the first control execution part 291 is currently controlling the control object 21, the fourth communication part 510 of the control switching device body 28 receives operation parameters and actual control data, which are stored on the fourth storage 580. To change a valve opening as a control value, for example, the fourth storage 580 stores valve-opening data as actual control data.

(Step S102)
The simulation execution part 593 calculates a control value based on operation parameters when using application programs. To change a valve opening as a control value, for example, the simulation execution part 593 calculates a valve opening when using application programs.

(Step S103)
The simulation execution part 593 calculates a variation deviated from a control value (i.e. actual control value) under the control of the first control execution part 291, which is calculated in step S102. To change a valve opening as a control value, for example, the simulation execution part 593 calculates a variation deviated from a valve opening (i.e. an actual valve opening), which is calculated in step S102 and which corresponds to data stored on the fourth storage 580.

(Step S104)
The simulation execution part 593 theoretically calculates a performance improvement value at each time instance so as to calculates a cumulative value of performance improvement in a predetermined duration. As the unit for performance improvements, it is possible to use a power-generator output [MW (Mega-Watt)] or efficiency [%]; but this is not a restriction.

(Step S105)

The switch-side display 620 displays a cumulative value of performance improvement calculated by the simulation execution part 593.

After step S105, the power plant 20 exits the process of FIG. 10.

Figure 11:
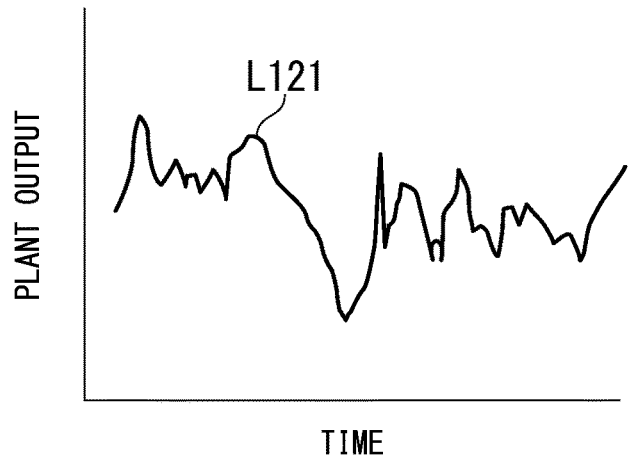
FIG. 11 is a graph showing an output example of a power plant according to the second embodiment.

FIG. 11 is a graph showing an output example of the power plant 20. In the graph of FIG. 11, the horizontal axis shows "TIME". The vertical axis shows "PLANT OUTPUT".

A line L121 shows a characteristic curve representative of a plant output with respect to time.

Figure 12:
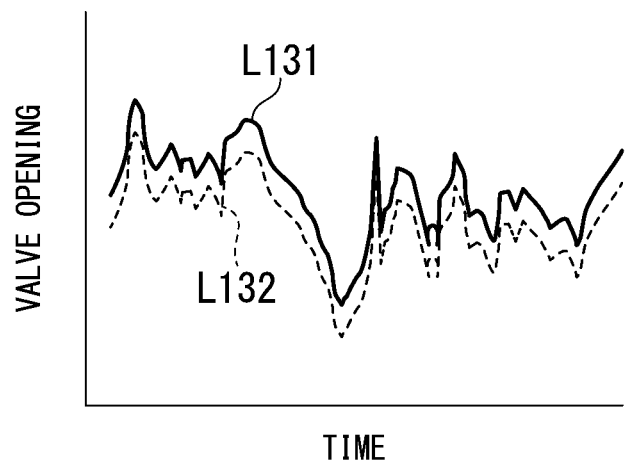
FIG. 12 is a graph showing an example of a valve opening controlled by a first control execution part according to the second embodiment and an example of a valve opening controlled by the second control execution part.

FIG. 12 is a graph showing an example of a valve opening under the control of the first control execution part 291 and an example of a valve opening under the control of the second control execution part 591. In the graph of FIG. 12, the horizontal axis shows "TIME". The vertical axis shows "VALVE OPENING".

A line L131 exemplifies a valve opening under the control of the first control execution part 291 with respect to time. A line L132 exemplifies a valve opening under the control of the second control execution part 591 with respect to time. FIG. 12 exemplifies valve openings determined by the first control execution part 291 and the second control execution part 591 in connection with the plant output shown in FIG. 11.

Figure 13:
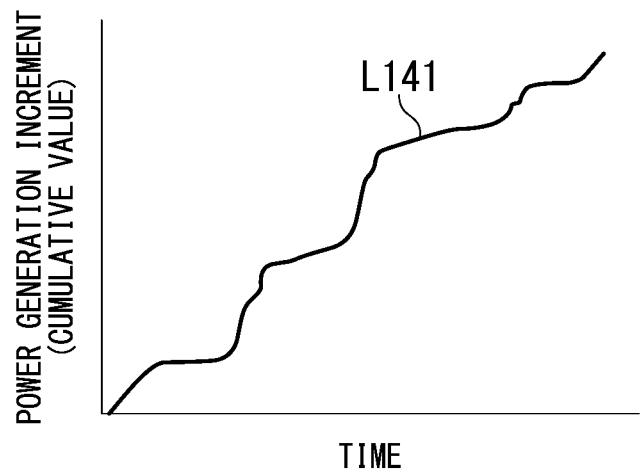
FIG. 13 is a graph showing an example of an effect realized by using the second control execution part according to the second embodiment.

FIG. 13 shows an example of an effect realized by using the second control execution part 591. In FIG. 13, the horizontal axis shows "TIME". The vertical axis shows a cumulative value of power-generation increments.

A line L141 exemplifies a cumulative value of power-generation increments realized by using the second control execution part 591 in comparison with power generation realized by disusing the second control execution part 591.

When the switch-side display 620 of the control switching terminal device 29 shows the graph of FIG. 13 on screen, for example, a user may determine whether or not to use the second control execution part 591 with reference to an effect realized by using the second control execution part 591.

In addition, the switch-side display 620 may display an actual improvement effect on screen. For example, a user who makes a user operation with the switch-side operation input part 630 may change his/her decision as to whether to use or disuse application programs (i.e. whether to use or disuse the second control execution part 591). The switch-side display 620 may display a performance value realized by using application programs and another performance value realized by disusing application programs. As the unit for performance, for example, it is possible to mention a power-generator output [MW (Mega-Watt)] or efficiency [%]; but this is not a restriction.

Figure 14:
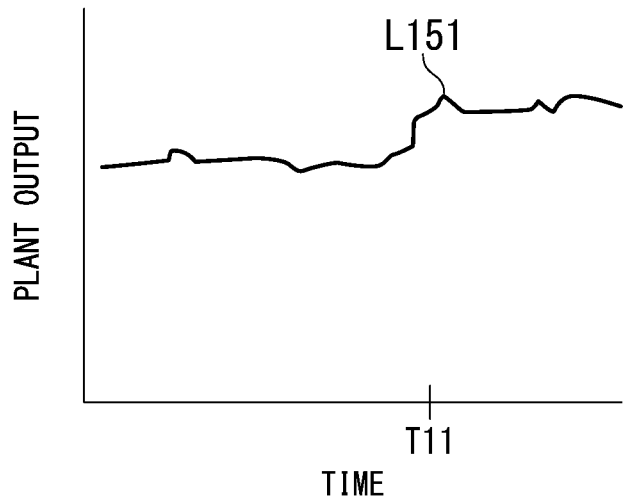
FIG. 14 is a graph showing a displayed example of an actual improvement effect realized by controlling a valve opening using the second control execution part according to the second embodiment.

FIG. 14 is a graph showing a displayed example of an actual improvement effect of a valve opening which is controlled using the second control execution part 591. In the graph of FIG. 14, the horizontal axis shows "TIME". The vertical axis shows "PLANT OUTPUT".

A line L151 exemplifies a plant output with respect to time.

In the case of FIG. 14, application programs are not used before time T11. At time T11, the present embodiment carries out a switching operation whether to use or disuse application programs, and therefore application programs will be used after time T11.

The switch-side display 620 displays plant outputs realized by using and disusing application programs respectively, and therefore a user may compare an effect realized by using application programs with another effect realized by disusing application programs. This makes it possible for a user to determine whether or not to sue application programs based on comparison results.

Next, an example of the operation of the second control execution part 591 configured to control a cooler will be described below.

For example, the second control execution part 591 may control a cooler, which is configured to cools a cooling mechanism toward a gas turbine, to optimize its performance. Specifically, the second control execution part 591 may controls a cooling-air temperature to be the highest temperature within an allowable range of temperatures. Accordingly, it is possible to improve a plant performance.

Upon disusing application programs, the cooling performance of a cooler, which is configured to cool cooling air for a gas turbine, may depend on atmospheric temperature and refrigerant temperature of cooling water for a plant. In general, a cooler performance is designed such that cooling-air temperature may fall within a design limit value while no performance control is carried out using refrigerant temperature. In this case, a lower refrigerant temperature may excessively cool cooling air more than necessary, which may cause a reduction of a plant performance.

On the other hand, it is possible to implement hardware modifications to control the performance of a cooler by providing a flow regulating valve for refrigerant or by re-designing a motor using an inverter.

Upon using application programs, the second control execution part 591 monitors cooling-air temperature on actual operation data. The second control execution part 591 calculates a feedback control for a cooler targeting at a control tracking line which is set close to a design limit value. The second control execution part 591 transmits to the control device 22 through the fourth communication part 510 a signal relating to a performance control of a cooler such as a valve opening or motor speed.

In the control device 22, the first control execution part 291 controls a valve opening or motor speed according to a signal from the second control execution part 591.

Accordingly, it is possible to increase cooling-air temperature and to thereby improve a plant performance by reducing a thermal emission.

Figure 15:
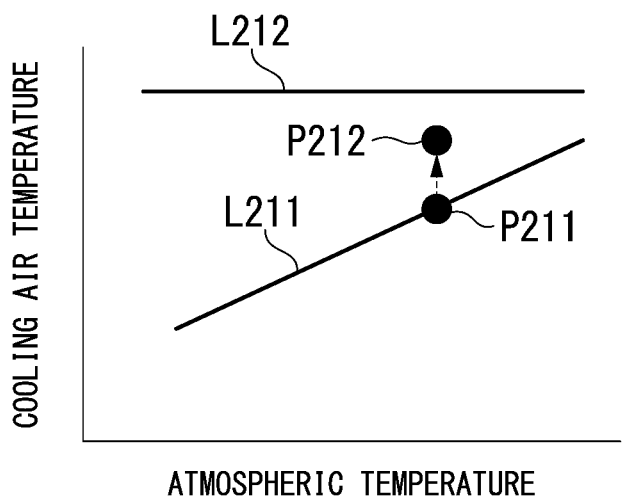
FIG. 15 is a graph showing examples of modifying cooling-air temperature with the second control execution part according to the second embodiment.

FIG. 15 is a graph showing an example of changing the cooling-air temperature using the second control execution part 591. In the graph of FIG. 15, the horizontal axis shows the atmospheric temperature. The vertical axis shows the cooling-air temperature. FIG. 15 shows temperature examples of cooling air which a cooling system (e.g. the cooling system 150 in the case of FIG. 3) supplies to a turbine (e.g. the turbine 140 in the case of FIG. 3). To cool a turbine, the cooling air should be reduced to a lower temperature to some extent. On the other hand, an excessive reduction of the cooling air may reduce efficiency of gas turbine 110. For this reason, it is preferable that cooling air be as high a temperature as possible within a range of temperatures capable of cooling a turbine.

In FIG. 15, a line L211 exemplifies a relationship between the atmospheric temperature and cooling-air temperature when the first control execution part 291 controls the cooling-air temperature. In this example, the first control execution part 291 determines the cooling-air temperature depending on the atmospheric temperature.

A line L212 shows an upper-limit design value in the cooling-air temperature. To cool a turbine, it is required that the cooling-air temperature be below an upper-limit value indicated by the line L212.

A point P211 exemplifies the cooling-air temperature determined by the first control execution part 291. A point P212 exemplifies the cooling-air temperature determined by the second control execution part 591. At the same atmospheric temperature, the second control execution part 591 sets the cooling-air temperature at a higher value than the cooling-air temperature set by the first control execution part 291 below the upper-limit value. Accordingly, it is expected to improve efficiency of a gas turbine.

The second control execution part 591 may calculate a correction value against a control value determined by the first control execution part 291, or the second control execution part 591 may calculate a control value independently of the first control execution part 291. As a control value, it is possible to use an opening of a flow regulating valve configured to control a flow rate of cooling air or motor speed of a cooler for cooling air; but this is not a restriction.

An operation to display an improvement effect realized by disusing application programs may be similar to the foregoing operation as described above with reference to FIG. 10. To change a cooler control, the simulation execution part 593 calculates a variation deviated from the cooling-air temperature (i.e. actual cooling-air temperature) under the control of the first control execution part 291, which is calculated based on an assumption to use application programs in step S103.

Figure 16:
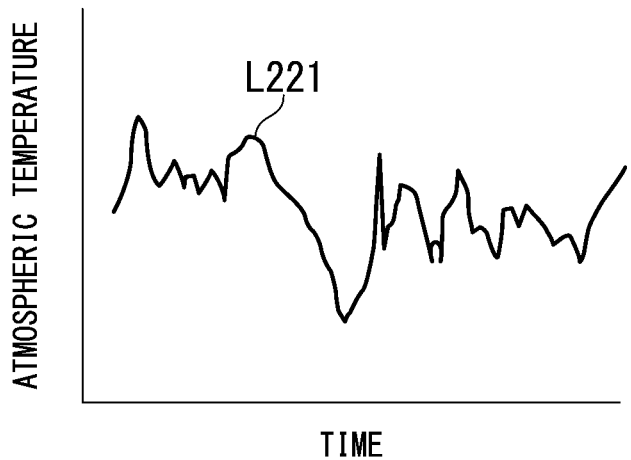
FIG. 16 is a graph showing an example of atmospheric temperature.

FIG. 16 is a graph showing an example of atmospheric temperature. In the graph of FIG. 16, the horizontal axis shows "TIME". The vertical axis shows "ATMOSPHERIC TEMPERATURE". A line L221 exemplifies the atmospheric temperature with respect to time.

Figure 17:
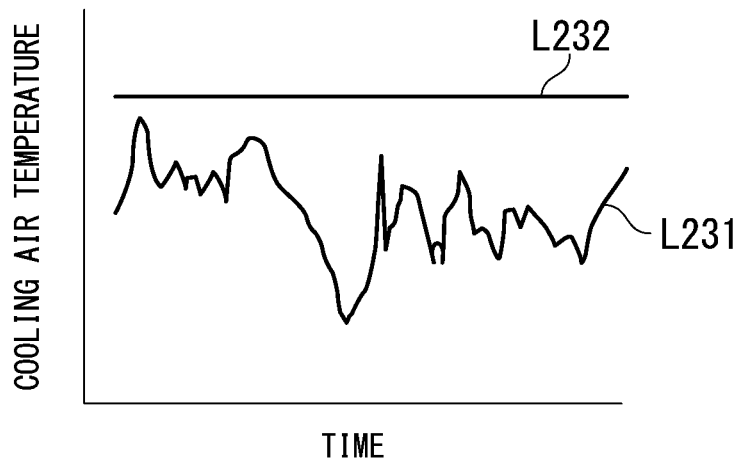
FIG. 17 is a graph showing an example of cooling-air temperature controlled by the first control execution part according to the second embodiment and an example of cooling-air temperature controlled by the second control execution part.

FIG. 17 is a graph showing an example of the cooling-air temperature under the control of the first control execution part 291 and an example of the cooling-air temperature under the control of the second control execution part 591. In the graph of FIG. 17, the horizontal axis shows "TIME". The vertical axis shows "COOLING AIR TEMPERATURE".

A line L231 exemplifies the cooling-air temperature under the control of the first control execution part 291 with respect to time. A line L232 exemplifies the cooling-air temperature under the control of the second control execution part 591 with respect to time. FIG. 17 shows an example of the cooling-air temperatures determined by the first control execution part 291 and the second control execution part 591 in connection with the atmospheric temperature shown in FIG. 16.

Figure 18:
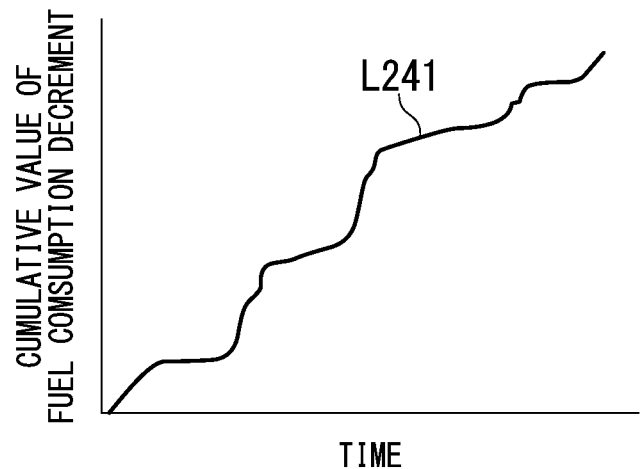
FIG. 18 is a graph showing an example of an effect realized by using the second control execution part according to the second embodiment.

FIG. 18 is a graph showing an example of an effect realized by using the second control execution part 591. In FIG. 18, the horizontal axis shows "TIME". The vertical axis shows a cumulative value of fuel consumption decrements.

A line L241 exemplifies a cumulative value of fuel consumption decrements realized by using the second control execution part 591 in comparison with fuel consumption realizing by disusing the second control execution part 591.

When the switch-side display 620 of the control switching terminal device 29 displays the graph of FIG. 18 on screen, for example, a user may determine whether or not to use the second control execution part 591 with reference to the effect realized by using the second control execution part 591.

Similar to the foregoing descriptions about an example of changing a valve opening, the switch-side display 620 may display an actual improvement effect on screen.

Figure 19:
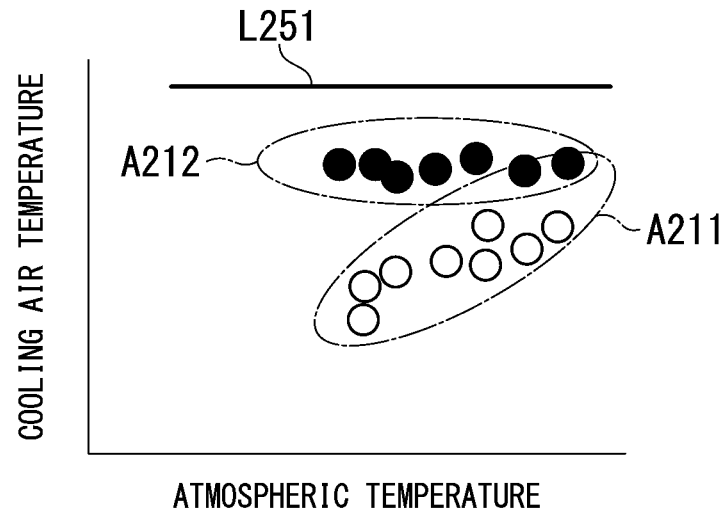
FIG. 19 is a graph showing examples of plant outputs realized with/without using the second control execution part according to the second embodiment.

FIG. 19 shows examples of plant outputs realized by using and disusing the second control execution part 591. In the graph of FIG. 19, the horizontal axis shows "ATMOSPHERIC TEMPERATURE". The vertical axis shows "COOLING AIR TEMPERATURE".

White circles shown in an area A21 exemplify the cooling-air temperatures realized by disusing the second control execution part 591. Black circles shown in an area A212 exemplify the cooling-air temperatures realized by using the second control execution part 591. A line L251 shows an upper-limit design value of the cooling-air temperature.

Upon using the second control execution part 591, the cooling-air temperature is set to be as high a temperature as possible below the upper-limit design value.

Figure 20:
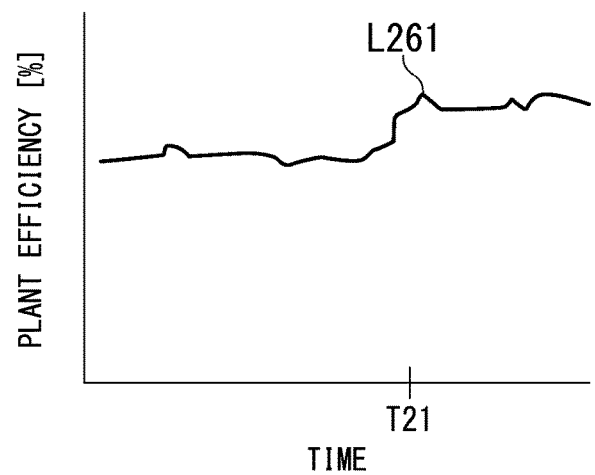
FIG. 20 is a graph showing a displayed example of an actual improvement effect realized by using the second control execution part of the second embodiment configured to control cooling-air temperature.

FIG. 20 is a graph showing a displayed example of an actual improvement effect realized by the second control execution part 591 controlling the cooling-air temperature. In the graph of FIG. 20, the horizontal axis shows "TIME". The vertical axis shows "PLANT EFFICIENCY [%]".

A line L261 exemplifies plant efficiency with respect to time.

In the case of FIG. 20, application programs have not been used before time T21. At time T21, the present embodiment carries out a switching operation as to whether to use or disuse application programs, and therefore application programs will be used after time T21.

The switch-side display 620 displays plant efficiency realized by disusing application programs and plant efficiency realized by using application programs. Accordingly, a user may compare an effect realized by using application programs with an effect realized by disusing application programs. This makes it possible for a user to determine whether or not to use application programs based on comparison results.

As described above, the switch-side operation input part 630 of the control switching terminal device 29 receives a user operation indicating a switching operation as to whether to use or disuse the second control execution part 591. Due to a user operation indicating the use of the second control execution part 591, the control switching part 592 causes the second control execution part 591 to control the control object 21. Due to a user operation indicating the disuse of the second control execution part 591, the control switching part 592 stops the control of the second control execution part 591 but causes the first control execution part 291 to control the control object 21.

According to the control switching part 592 configured to switch between the use and the disuse of the second control execution part 591 according to a user operation, a user may experimentally use the second control execution part 591. Therefore, a user may experimentally use the second control execution part 591 to determine whether or not to introduce the second control execution part 591. Therefore, it is possible for the power plant 20 to introduce a new control made by the second control execution part 591 with relative ease.

Upon obtaining a good result through using the second control execution part 591, for example, a user may constantly continue to use the second control execution part 591, or a user may spontaneously use the second control execution part 591 as necessary. When a user fails to obtain a good result through using the second control execution part 591, a user may limit the use of the second control execution part 591. In other words, a user may stop the second control execution part 591 to control the control object 21.

In addition, it is possible to flexibly set a charging system against the use of the second control execution part 591 due to separation of functionality between the first control execution part 291 and the second control execution part 591. In particular, it is possible to implement a usage-rate charging system for the use of the second control execution part 591.

For example, a provider of the second control execution part 591 may charge an amount of payment depending on a user's used time of the second control execution part 591. Alternatively, a provider of the second control execution part 591 may charge an amount of payment based on a quantitative evaluation of an effect realized by a user using the second control execution part 591. As described above, the effect may be a pecuniary effect or pecuniary benefits. In addition, it is possible to charge an amount of payment according to the number of calculations made by the second control execution part 591 or an amount of transmission data representing results of calculations.

Owing to a usage-rate charging system for the use of the second control execution part 591, it is possible to reduce an initial cost to be lower than an initial cost for selling the second control execution part 591 as a single device. Therefore, it is possible for the power plant 20 to introduce a new control implemented by the second control execution part 591 with relative ease.

The switch-side display 620 may display an effect which is produced when the control switching part 592 causes the second control execution part 591 to control the control object 21.

Accordingly, a user may determine whether or not to use the second control execution part 591 with reference to an effect realized by using the second control execution part 591.

In addition, the switch-side display 620 may display an effect produced when the control switching part 592 causes the second control execution part 591 to control the control object 21 in comparison with an effect realized by the control of the first control execution part 291 to control the control object 21 while stopping the control of the second control execution part 591.

Accordingly, a user may determine whether or not to use the second control execution part 591 through comparison between an effect of using the second control execution part 591 and an effect of disusing the second control execution part 591.

In addition, the switch-side display 620 may display the operation result information based on measurement data obtained by the first control execution part 291 to control the control object 21 and the operation result information based on measurement data obtained by the second control execution part 591 to control the control object 21.

In this case, the switch-side display 620 displays the operation result information based on measured values, which may not include simulation errors. Therefore, a user may determine whether or not to use the second control execution part 591 with reference to more accurate information.

The fourth storage 580 is configured to store a history of operation parameters used for controlling the control object 21 and first operation history information representing results of controlling the control object 21 using a history of operation parameters under the first control execution part 291. The simulation execution part 593 carries out simulation of the second control execution part 591 controlling the control object 21 using a history of operation parameters, thus producing second operation history information representing simulation results. The switch-side display 620 may display both the first operation history information and the second operation history information.

As described above, the switch-side display 620 is configured to display operation results based on results of simulation of the second control execution part 591, and therefore it is possible to display operation results even when the second control execution part 591 does not actually control the control object 21.

In addition, the switch-side display 620 is able to display control results of the first control execution part 291 and control results of the second control execution part 591 at the same condition indicated by the same operation parameter(s). That is, a user may compare control results at a high accuracy through comparison between control results at the same condition.

In this connection, the simulation execution part 593 carries out simulation using certain data, which are not necessarily limited to previous data obtained in the past. The switch-side display 620 may concurrently display control results of the first control execution part 291 and control results of the second control execution part 591 in real time. Specifically, the switch-side display 620 may concurrently display the first operation result information representing results of the first control execution part 291 controlling the first control object 21 using operation parameters and the second operation result information representing results of the second control execution part 591 controlling the control object 21 using operation parameters.

As described above, the switch-side display 620 is configured to display operation results based on results of simulating the control of the second control execution part 591, and therefore it is possible to display operation results even when the second control execution part 591 does not actually control the control object 21.

In addition, the switch-side display 620 is able to concurrently display control results of the first control execution part 291 and control results of the second control execution part 591 at the same condition indicated by the same operation parameter(s). That is, a user may compare control results at a high accuracy through comparison between control results at the same condition.

The fourth communication part 510 is configured to acquire the usage information representing a degree of controlling the control object 21 under the second control execution part 591. The charging calculation part 594 calculates an amount of payment for the use of the second control execution part 591 based on the usage information.

Accordingly, the control switching device 27 is able to charge an amount of payment according to a usage-rate charging system for the use of the second control execution part 591. Therefore, it is possible to obtain various options as other sales plans or charging plans, which are not necessarily limited to sales planning to sell the second control execution part 591 as an independent device.

Next, an example of a hardware configuration constituting the plant 10 and the power plant 20 will be described with reference to FIG. 21.

Figure 21:
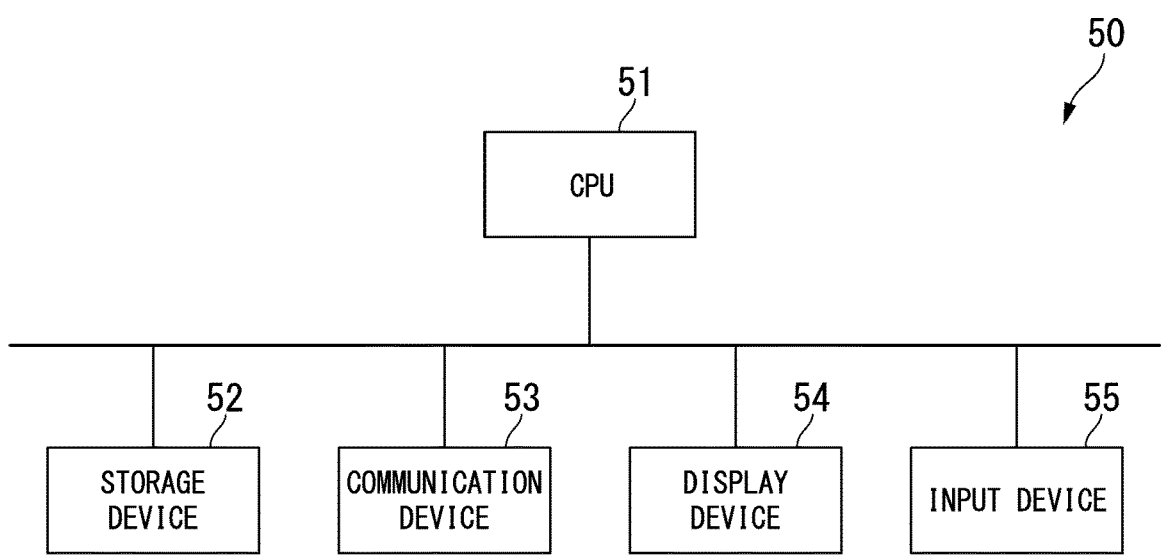
FIG. 21 is a block diagram showing a configuration example of a computer according to at least one embodiment.

FIG. 21 is a block diagram showing a configuration example of a computer according to at least one embodiment. A computer 50 shown in FIG. 21 includes a CPU 51, a storage device 52, a communication device 53, a display device 54, and an input device 55. The storage device 52 is configured to store programs and various pieces of information. The CPU 51 controls various parts of the computer 50 to implement various processes such that the CPU 51 reads and executes programs from the storage device 52.

The communication device 53 is configured to communicate with other devices. The display device 54 is configured to display various images. The input device 55 is configured to input user operations.

In this connection, the computer 50 does not necessarily needs all the hardware parts shown in FIG. 21. To implement the functionality of devices having a terminal device built in another housing such as the remote server device body 25 and the control switching device body 28 with the computer 50, for example, the computer 50 may not necessarily include the display device 54 and the input device 55.

The plant 10 and the power plant 20 may be entirely or partially implemented by one or more computers 50.

For example, programs representing the operations of the first control execution part 12, the second control execution part 13, and the control switching part 15 included in the plant 10 may be entirely or partially stored on the storage device 52. The CPU 51 reads programs from the storage device 52 so as to carry out the processes of the first control execution part 12, the second control execution part 13, and the control switching part 15 according to programs. All the first control execution part 12, the second control execution part 13, and the control switching part 15 may be implemented by a single computer 50, or at least one thereof may be implemented by another computer. The operation input part 14 is implemented by the input device 55.

The control device 22, the remote server device body 25, the remote terminal device 26, the control switching device body 28, and the control switching terminal device 29 included in the power plant 20 may be each implemented by a single computer 50.

The first storage 280 of the control device 22 is implemented by the storage device 52. Programs representing the operation of the first controller 290 are stored on the storage device 52. The CPU 51 reads programs from the storage device 52 so as to carry out the process of the first controller 290 according to programs. The first communication part 210 is implemented by the communication device 53.

The second storage 380 of the remote server device body 25 is implemented by the storage device 52. Programs representing the operation of the second controller 390 are stored on the storage device 52. The CPU 51 reads programs from the storage device 52 so as to carry out the process of the second controller 390 according to programs. The second communication part 310 is implemented by the communication device 53.

The third storage 480 of the remote terminal device 26 is implemented by the storage device 52. Programs representing the operation of the third controller 490 are stored on the storage device 52. The CPU 51 reads programs from the storage device 52 so as to carry out the process of the third controller 490 according to programs. The third communication part 410 is implemented by the communication device 53. The remote-side display 420 is implemented by the display device 54. The remote-side operation input part 430 is implemented by the input device 55.

The fourth storage 580 of the control switching device body 28 is implemented by the storage device 52. Programs representing the operation of the fourth controller 590 are stored on the storage device 52. The CPU 51 reads programs from the storage device 52 so as to carry out the process of the fourth controller 590 according to programs. The fourth communication part 510 is implemented by the communication device 53.

The fifth storage 680 of the control switching terminal device 29 is implemented by the storage device 52. Programs representing the operation of the fifth controller 690 are stored on the storage device 52. The CPU 51 reads programs from the storage device 52 so as to carry out the process of the fifth controller 690 according to programs. The fifth communication part 610 is implemented by the communication device 53. The switch-side display 620 is implemented by the display device 54. The switch-side operation input part 630 is implemented by the input device 55.

In this connection, programs entirely or partially achieving the functions of the plant 10 and the power plant 20 can be stored on computer-readable storage media, and therefore computer systems may load and execute programs stored on storage media, thus implementing processes of various parts. Herein, the term "computer system" may include an OS and hardware such as peripheral devices.

In addition, the "computer system" using a WWW system may include homepage-providing environments (or homepage-displaying environments).

In addition, the term "computer-readable storage media" may refer to flexible disks, magneto-optical disks, ROM, portable media such as CD-ROM, and storage devices such as hard disks embedded in computer systems. The aforementioned programs may partially achieve the foregoing functions, or the aforementioned programs may be combined with pre-installed programs of computer systems to achieve the foregoing functions.

Heretofore, the present invention has been described in detail by way of the embodiments with reference to the drawings, although concrete configurations are not necessarily limited to the embodiments; hence, the present invention shall include design changes without departing from the subject matter of the invention.

INDUSTRIAL APPLICABILITY

According to the control switching device, the plant, the control switching method and the program, it is possible to introduce a new control with relative ease.

REFERENCE SIGNS LIST 10 plant
11, 21 control object
12, 291 first control execution part
13, 591 second control execution part
14 operation input part
15, 592 control switching part
20 power plant
22 control device
210 first communication part
280 first storage
290 first controller
23 gateway device
24 remote server device
25 remote server device body
310 second communication part
380 second storage
381 remote-side operation parameter history storage
382 remote-side operation result data history storage
390 second controller
391 application generator
392 application installer
26 remote terminal device
410 third communication part
420 remote-side display
430 remote-side operation input part
480 third storage 490 third controller
27 control switching device
28 control switching device body
510 fourth communication part
580 fourth storage
581 switch-side operation parameter history storage
582 switch-side operation result data history storage
590 fourth controller
593 simulation execution part
594 charging calculation part
29 control switching terminal device
610 fifth communication part
620 switch-side display
630 switch-side operation input part
680 fifth storage
690 fifth controller
91 communication network

The invention claimed is:

1. A control switching device separated from a control device comprising a first control execution part configured to carry out a control over a control object relating to a predetermined operation parameter of a power plant and configured to switch the control over the control object, comprising:
   a communication part configured to communicate with the control device;
   a second control execution part configured to carry out a different control over the control object than the control of the first control execution part by changing at least part of the control over the control object according to an application installed therein via the communication part;
   an operation input part configured to receive a switching operation as to whether to use or disuse the first control execution part and the second control execution part; and
   a control switching part configured to make a transition from a first control mode configured to use the control of the first control execution part to a second control mode configured to use the control of the second control execution part by cooperating with the control of the first control execution part or by stopping the control of the first control execution part when the switching operation indicates the use of the second control execution part, or to make a transition to the first control mode configured to use the control of the first control execution part by stopping the control of the second control execution part when the switching operation indicates the disuse of the second control execution part.

2. The control switching device according to claim 1, further comprising a display configured to display an effect of improving operation efficiency of the power plant realized by controlling the control object in the second control mode compared to the first control mode.

3. The control switching device according to claim 2, wherein the display is further configured to display operation result information based on measurement data produced by controlling the control object in the first control mode and operation result information based on measurement data produced by controlling the control object in the second control mode.

4. The control switching device according to claim 2, further comprising a storage configured to store a history of operation parameters for the control object and first operation history information representing a result of controlling the control object using the operation parameters included in the history of operation parameters in the first control mode; and
   a simulation execution part configured to calculate second operation history information by executing a simulation of controlling the control object using the operation parameters included in the history of operation parameters in the second control mode,
   wherein the display is further configured to display the first operation history information and the second operation history information.

5. The control switching device according to claim 1, further comprising a usage information acquisition part configured to acquire usage information representing a degree of controlling the control object with the second control execution part; and
   a charging calculation part configured to calculate an amount of payment for the use of the second control execution part based on the usage information.

6. A power plant, comprising:
   a control object relating to a predetermined operation parameter of a power plant;
   a first control execution part included in a control device, which is configured to carry out a control over the control object in an operation of the plant;
   a second control execution part included in a control switching device separated from the control device and comprising a communication part configured to communicate with the control device, wherein the second control execution part is configured to carry out a different control over the control object than the control of the first control execution part by changing at least part of the control over the control object according to an application installed therein via the communication part;
   an operation input part configured to receive a switching operation as to whether to use or disuse the first control execution part and the second control execution part; and
   a control switching part configured to make a transition from a first control mode configured to use the control of the first control execution part to a second control mode configured to use the control of the second control execution part by cooperating with the control of the first control execution part or by stopping the control of the first control execution part when the switching operation indicates the use of the second control execution part, or to make a transition to the first control mode configured to use the control of the first control execution part by stopping the control of the second control execution part when the switching operation indicates the disuse of the second control execution part.

7. The plant according to claim 6, further comprising an application generator configured to generate an application program for implementing the control of the second control mode; and
   an application installer configured to implement the control of the second control mode by installing the application program.

8. A control switching method configured to switch a control over a control object in association with a control device comprising a first control execution part configured to carry out a control over the control object relating to a predetermined operation parameter of a power plant, comprising:
- receiving a switching operation as to whether to use or disuse the first control execution part and a second control execution part which is included in a control switching device separated from the control device and comprising a communication part configured to communicate with the control device, wherein the second control execution part is configured to carry out a different control over the control object than the control of the first control execution part by changing at least part of the control over the control object according to an application installed therein via the communication part; and
- making a transition from a first control mode configured to use the control of the first control execution part to a second control mode configured to use the control of the second control execution part by cooperating with the control of the first control execution part or by stopping the control of the first control execution part when the switching operation indicates the use of the second control execution part, or a transition to the first control mode configured to use the control of the first control execution part by stopping the control of the second control execution part when the switching operation indicates the disuse of the second control execution part.

9. A non-transitory computer-readable storage medium having a stored program causing a computer to handle a control object association with a control device comprising a first control execution part configured to carry out a control over the control object relating to a predetermined operation parameter of a power plant, thus implementing:
- acquiring switching operation information representing a switching operation as to whether to use or disuse the first control execution part and a second control execution part which is included in a control switching device separated from the control device and comprising a communication part configured to communicate with the control device, wherein the second control execution part is configured to carry out a different control over the control object than the control of the first control execution part by changing at least part of the control over the control object according to an application installed therein via the communication part; and
- making a transition from a first control mode configured to use the control of the first control execution part to a second control mode configured to use the control of the second control execution part by cooperating with the control of the first control execution part or by stopping the control of the first control execution part when the switching operation indicates the use of the second control execution part, or a transition to the first control mode configured to use the control of the first control execution part by stopping the control of the second control execution part when the switching operation indicates the disuse of the second control execution part.

* * * * *